Figure 5:
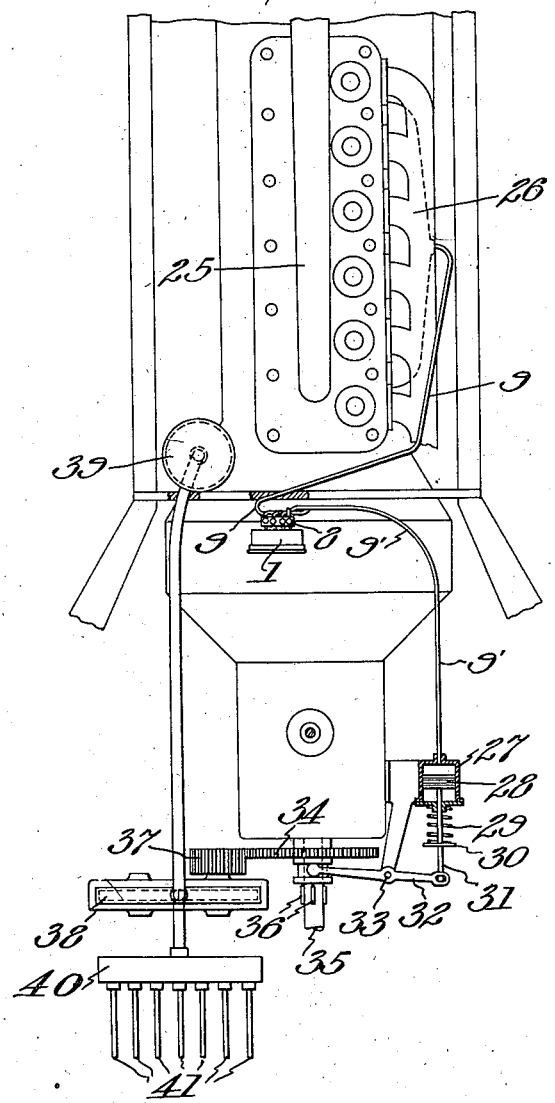

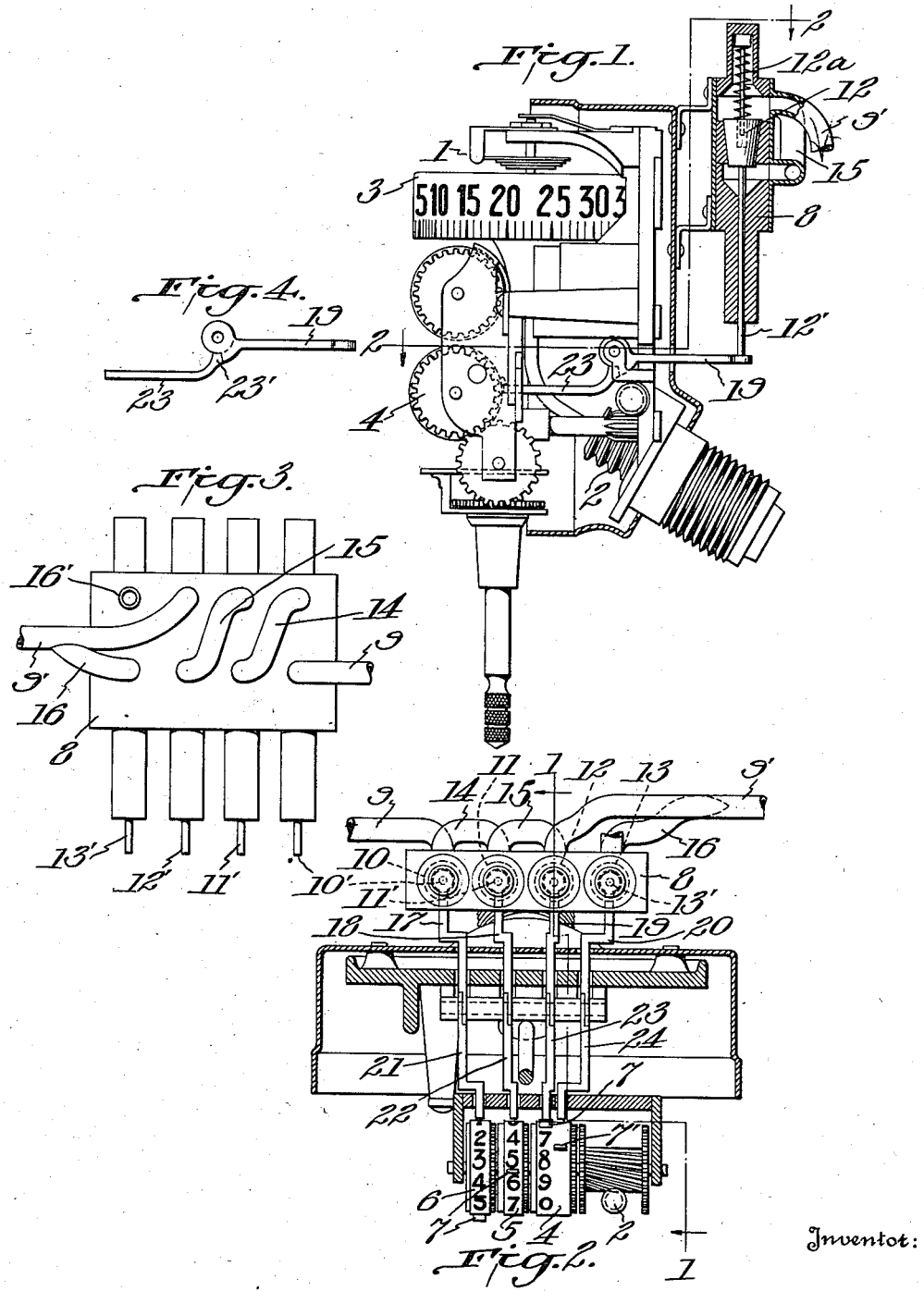
Feb. 4, 1936. W. M. LIPPINCOTT 2,029,327
AUTOMATIC LUBRICATING MECHANISM
Filed Jan. 28, 1928 3 Sheets-Sheet 1

Feb. 4, 1936.  W. M. LIPPINCOTT  2,029,327
AUTOMATIC LUBRICATING MECHANISM
Filed Jan. 28, 1928  3 Sheets-Sheet 2

Inventor:
Walter M. Lippincott,
By Byrnes Townsend & Buckenstein,
Attorneys.

Feb. 4, 1936.  W. M. LIPPINCOTT  2,029,327
AUTOMATIC LUBRICATING MECHANISM
Filed Jan. 28, 1928  3 Sheets-Sheet 3
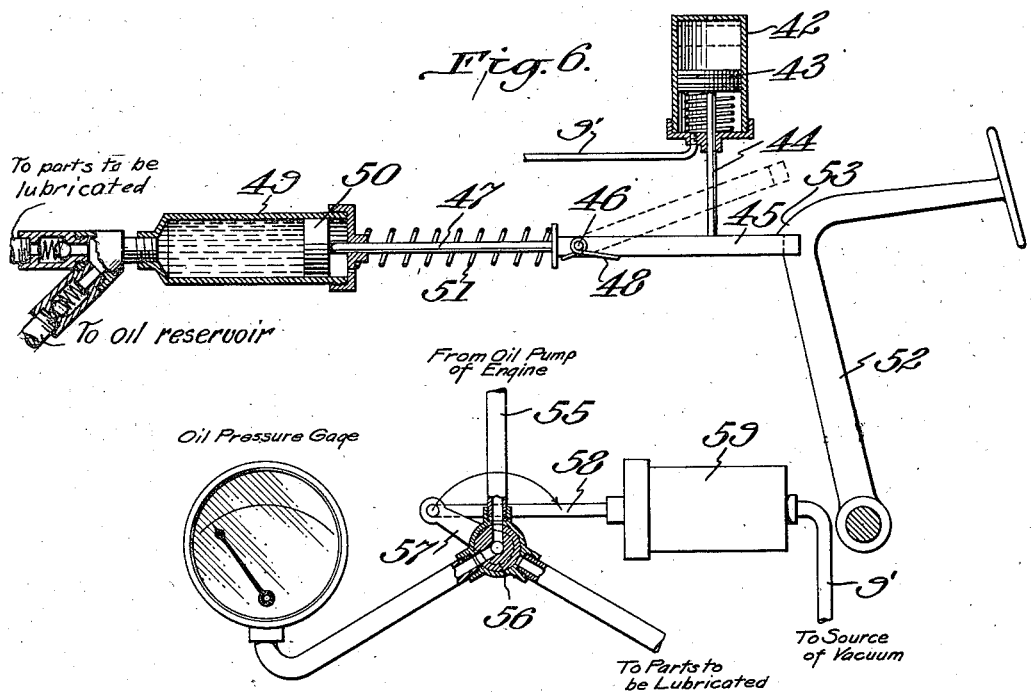
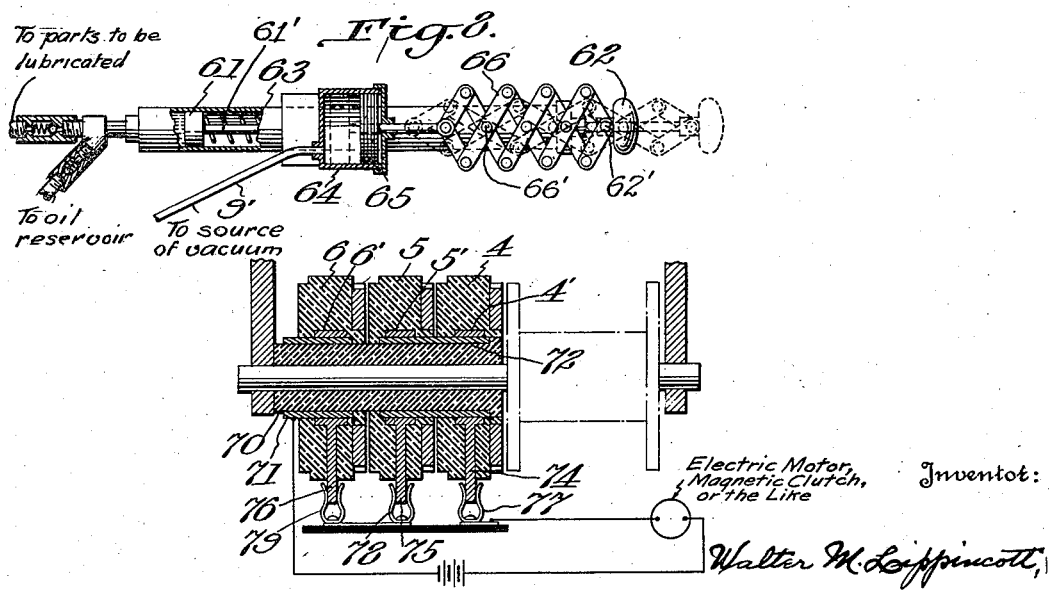

Patented Feb. 4, 1936

2,029,327

UNITED STATES PATENT OFFICE 2,029,327

AUTOMATIC LUBRICATING MECHANISM

Walter Maynard Lippincott, Lynbrook, N. Y., assignor to Potter, Pierce & Scheffler, a firm, Washington, D. C.

Application January 28, 1928, Serial No. 250,245

17 Claims. (Cl. 184—7)

This invention relates to an automatic system of lubrication, and more particularly to a system for lubricating moving parts of machinery or vehicles which are not usually automatically oiled or greased.

Although the following description is directed essentially to a system as used on vehicles, it will be understood that the invention is not so limited.

As applied to the lubrication of vehicles the invention is directed more particularly to the lubrication of the chassis thereof. In the modern self-propelled vehicles today, lubrication on the engine and accessory parts thereof is usually automatically taken care of by the engine itself. The chassis of such vehicles, however, has many points requiring periodic lubrication, and such points are frequently provided with means adapted to receive a lubricant by hand operated means. Some vehicles have been provided with pipes leading to these points on the chassis whereby lubricant is distributed to all chassis parts requiring lubrication by forcing oil or grease into these pipes.

In all of the above systems, however, the attention of the operator of the vehicle is necessary to lubricate the chassis and he must constantly keep in mind the necessity of chassis lubrication.

It is an object of this invention to provide a lubrication system for a series of relatively moving parts which is entirely automatic and which obviates all mental and/or manual labor and which operates in response to a predetermined relative movement of said parts.

A further and more specific object of the invention is to provide a lubricating system which will automatically lubricate the chassis of an automotive vehicle in response to the travel thereof, at predetermined intervals and irrespective of the revolutions of the engine.

A further object is to provide a lubricating system of the above character which is simple, inexpensive, positive in action and not easily deranged.

These and other objects will be apparent from the following description taken in connection with the accompanying drawings, wherein, Fig. 1 is a partial section of a speedometer and odometer of an automobile having one form of this invention associated therewith, and taken on line 1—1 of Fig. 2, Fig. 2 is a section on line 2—2 of Fig. 1, Fig. 3 is a side elevation of the control means of Figs. 1 and 2, Fig. 4 is a detail of the levers for controlling the valves of Figs. 1, 2 and 3, Fig. 5 is a partial plan of an automobile chassis showing one form of lubricating system therefor, Fig. 6 shows a modified system for operating the lubricator, Fig. 7 shows another modification, Fig. 8 shows a modification of the invention associated with a hand operated lubricator.

Fig. 9 shows in section a modification of the odometer dials for electric control of a lubricator.

Referring to Figs. 1 to 5 of the drawings, a typical speedometer 1 is shown, such as used on automobiles, having a drive 2 for operating the speed indicator 3 and the odometer dials 4, 5 and 6. The dial 4 registers tenths of a mile traveled, the dial 5 registers unit miles traveled, and the dial 6 registers tens of miles.

The first dial 4 covers one mile and is divided into ten units of $\frac{1}{10}$ of a mile each, the second dial 5 is divided into ten units of one mile each, and the third dial 6 is divided into ten units of ten miles. The first dial revolves at a speed of one revolution in one mile. When dial No. 4 makes a complete revolution a small trip pinion couples dial No. 4 and dial No. 5 and carries dial No. 5 one division or one mile. At this point the little trip pinion is released, dial No. 5 remains in this position until the next complete revolution of dial No. 4, when it repeats this operation. This is repeated at the end of each mile until dial No. 5 has registered the completion of nine miles travel. At this point the trip pinion connecting dial No. 5 and dial No. 6 drops into place and all three dials move up one division, so that the trip section now registers 10.0 miles, and so on up to 100 miles, when all dials register zero.

This invention takes advantage of these dial movements to thereby automatically render operable a lubricating system for the vehicle chassis, in the following manner. Each of the dials 5 and 6 has a lug 7 thereon placed diametrically opposite the "0" of the dial, each of said lugs arranged to operate a separate control for a lubricating system. Dial 4 has a lug 7 opposite the "1" thereon and a second lug 7' oppostie the "2" thereon. The purpose in disposing the lug 7 on dial 4 opposite the "1" instead of opposite the "0", as on dials 5 and 6, will appear below. In the invention as illustrated in Figs. 1 to 4, the controls operated by lugs 7 and 7' comprise serially arranged valves, such that when all valves are open a passage for fluid pressure or suction is opened, thereby operatively positioning the lubrication system.

Secured to the rear of the speedometer casing by brackets is a valve casing 8 having an inlet pipe 9 and outlet pipe 9'. Casing 8 has four poppet valves 10, 11, 12 and 13 therein and branch passages 14, 15 and 16, the valve 10 normally closing the passage in the casing which connects pipe 9 and branch 14, the valve 11 normally closing the passage in the casing which connects branch 14 and branch 15, and valve 12 normally closing the passage in the casing which connects branch 15 with pipe 9'.

The valves 10, 11, 12 and 13 are similar in structure and have stems 10', 11', 12' and 13' by which they may be forced from their seats against the force of light springs, one of said springs, 12a, being shown in Fig. 1.

The mechanism for operating the poppet valves comprises a series of levers 17, 18, 19 and 20, all pivoted on a rod which is secured to the speedometer casing. These levers 17, 18, 19 and 20 project through slots in the speedometer casing to a position adjacent the lower ends of valve rods 10', 11', 12' and 13'. Also pivoted to the speedometer casing are four levers 21, 22, 23 and 24, each of these levers having shoulders thereon for contacting engagement with cooperating shoulders on levers 17, 18, 19 and 20. One such shoulder is designated 23' on lever 23 of Fig. 4.

Levers 21, 22, 23 and 24 extend to points adjacent the rims of the odometer dials 4, 5 and 6, lever 21 being thus associated with dial 6, lever 22 being associated with dial 5, and levers 23 and 24 being associated with dial 4. The projections 7 and 7' on the odometer dials are arranged to engage and depress the levers 21, 22, 23 and 24 to thereby open valves 10, 11, 12 and 13.

The two projections 7 and 7' on dial 4 are spaced one division or one-tenth mile apart, the first of said projections operating lever 23 and the second operating lever 24.

The operation of the invention as thus far described is as follows:

Pipe 9 is connected to a source of pressure or vacuum and pipe 9' is connected to any means for rendering a lubricating device operable by the suction or pressure in said pipe. Assuming now the vehicle starts in motion with the odometer dials 6, 5 and 4 registering 0, 0, 1 or one-tenth mile. During the motion of the vehicle up to 100 miles, valve 12 will open every mile of travel, valve 11 will open every 10 miles of travel, but valve 10 will open only when 100 miles have been traveled. At this point the dials 6, 5 and 4 register, respectively, 0, 0, 1 and the projections 7 have simultaneously depressed levers 21, 22 and 23 to thereby simultaneously open valves 10, 11 and 12, valve 13 remaining closed. The fluid under pressure or suction thus may freely pass from pipe 9 to pipe 9' through the serially arranged valves and passages to either directly actuate a lubricating mechanism or to place such mechanism in an operable condition. This condition remains for one-tenth mile of travel, when lug 7' engages lever 24 to thereby open valve 13. This valve 13 connects bleed passage 16 of pipe 9' with the open air by means of opening 16', thus releasing the suction or pressure on the lubricating mechanism which may return to its original inoperative condition. At the end of another 100 miles of travel the above operation is automatically repeated.

As mentioned above, the lug 7 on dial 4 is disposed opposite the "1" instead of opposite the "0", as on dials 5 and 6. The reason for doing this will be apparent from a consideration of the operation of the odometer. It will be noted that when dial 5 attains the position in which it registers "0", it remains in this position until dial 4 has rotated through nearly one revolution and does not begin to move into the position in which it registers "1" until dial 4 begins to move from "9" position to "0" position. Thus it will be seen that a second time in every 100 miles, the dials approach the position in which they all register "0", hence there is a possibility that the valves all will be opened a second time in every 100 miles. Hence, if the lug 7 on dial 4 were disposed opposite the "0", there would be a possibility that the valves would all be opened when the odometer has just completed 100 miles and when it has completed slightly less than 101 miles. In order to obviate this difficulty, the lug 7 on dial 4 is disposed opposite the "1"—or opposite any succeeding number—whereby it is assured that the three valves are open simultaneously only once in every 100 miles. It will be seen that this result is obtained by so "offsetting" lug 7 on dial 4, because after the valves have all been opened, at the end of 100 miles, and then closed, the dial 5 will be rotated one step to bring the "1" into registry before lug 7 on dial 4 again rotates into operative position. Lug 7' on dial 4 is, of course, disposed opposite the "2"—or if lug 7 is disposed opposite some other numeral, lug 7' is, of course, disposed opposite the next succeeding numeral—so that the set of valves is open for only $\frac{1}{10}$ of a mile.

Referring to Fig. 5, there is shown one lubricating system which may be combined with the above-described odometer control. The speedometer 1 is shown as mounted on an automobile, the engine 25 of which has intake manifold 26. Pipe 9 is extended and is connected to the intake manifold 26 and pipe 9' is connected to a casing 27 containing a piston 28. Piston 28 is normally pulled downwardly by spring 29 acting on a cross piece 30 of piston rod 31.

Piston rod 31 is connected to a bar 32 which is pivoted to a stationary part of the vehicle at 33, the other end of bar 32 engaging a hub of gear 34. This gear 34 loosely surrounds the drive shaft 35 of the vehicle to the rear of the transmission and clutch thereof. Drive shaft 35 has splines 36 thereon and the hub of gear 34 has cooperative members for engaging said splines. Gear 34 meshes with another gear 37 connected to operate an oil pump 38. An oil reservoir 39 is mounted at any suitable point and connected to oil pump 38, the pump when operating forcing oil into a distributing manifold 40 having branches 41 leading to the various points on the chassis requiring lubrication.

The operation of this mechanism is as follows:

Normally the spring 29 holds gear 34 disengaged from splines 36 so that the oil pump is not operated by rotation of the drive shaft 35. When the odometer dials of speedometer 1 register one-tenth mile beyond one hundred miles of travel, the serially arranged valves open, as described in connection with Figs. 1 to 4, and the suction from the intake manifold acts through the passages to pull piston 28 upwardly. Gear 34 thus moves downwardly to engage splines 36 on the drive shaft 35 and the oil pump is thereby rotated to lubricate the chassis. When one-tenth of a mile is traversed, the release valve 13 is opened by lug 7' on the odometer dial 4 to thereby release the partial vacuum previously established in conduits 9 and 9' and casing 27. Spring 29 then disengages gear 34 from the drive shaft.

It will thus be seen that the odometer dials, actuated by the forward travel of the automobile, operate controls which place the lubricating system in an operable condition, that is, in engagement with the drive shaft. It will be noted that this drive shaft only rotates when the vehicle is in motion, so that if the vehicle should come to a stop with the odometer dials registering 0—0—1 and the gear 34 in engagement with splines 36 on shaft 35, the oil would not be wasted through the system by continued rotation of the pump, since the drive shaft 35 remains stationary as long as the vehicle is stationary. In the above case, the gear 34 would remain in engagement with shaft 35 until subsequent motion of the automobile, when it would operate the oil pump and then disengage.

It will thus be seen that the controls which are governed by the odometer dials merely operatively connect the lubricating means and a driving element therefor, and the force necessary to drive the lubricating means is supplied by said driving element; in the above case, the automobile drive shaft.

Although the pipes 9—9' are shown as connected in to the intake manifold whereby the suction of the engine operates the system, it will be understood that any other source of fluid pressure or suction could be used.

In Figs. 6, 7 and 8 there are shown other driving elements for the lubricating means, the odometer dial controls functioning to operatively associate the lubricating means with the drive element.

In Fig. 6, pipe 9' from the valve casing 8 is connected to a cylinder 42 in which is an upwardly spring-pressed piston 43. The lower end of piston rod 44 contacts with a lever 45 which is pivoted at 46 to another rod 47, a spring 48 normally holding lever 45 raised to the dotted line position. Rod 47 extends into a lubricator cylinder 49, and has a piston 50 secured thereto, within said cylinder. A spring 51 normally retracts piston 50.

In this modification, the force necessary for lubrication is supplied from one of the foot-pedals normally used on an automobile, such as the clutch-pedal or the brake-pedal. Such a pedal is indicated at 52 and has a shoulder 53 thereon for engagement with the notched end of lever 45.

The operation is as follows:

When the odometer dials open conduit 9' to the suction of the intake manifold, piston 43 is drawn downwardly. The piston rod 44 thus presses lever 45 about its pivot 46 and against spring 48 until the notched end of lever 45 passes below and catches on shoulder 53 of pedal 52. The lubricating piston 50 is thus operatively associated with the pedal 52, so that upon a subsequent pressure on the pedal, the oil or grease is forced to all chassis points requiring lubrication. This pressure on the foot pedal may occur very soon after the parts are so associated or may be at any subsequent time. The lever 45 remains so latched with the pedal, and the piston 43 may return to its normally raised position when the suction in line 9' is released. When pedal 52 is depressed and then released, the shoulder 53 disengages from lever 45 because the plunger 50 moves outwardly in response to pressure of spring 51 much slower than the return of pedal 52. Lever 45 then assumes its raised position shown in dotted lines.

In Fig. 7 the invention is shown associated with the oil pressure line of the engine. As is well known, most automobiles today have an oil pump thereon which is operated by the engine to continuously force oil to various engine parts. In this modification, this oil pump is used to periodically lubricate the chassis. In the oil pressure line 55 from the oil pump which normally leads to the oil pressure gauge is placed a valve 56. A lever 57 is secured to valve 56 for operating the same, lever 57 being connected to a piston rod 58, rod 58 having a piston in a cylinder 59, the arrangement being similar to the cylinder of Fig. 6 with the exception that the piston rod passes out the opposite end of the cylinder. Pipe 9' from the speedometer 1 is connected to cylinder 59. When the odometer dials open pipe 9' to suction, the valve 56 is turned so that the pressure of the oil pump forces oil to the chassis parts and not to the oil gauge. After one-tenth mile travel the suction is released and valve 56 returns to the position shown.

In Fig. 8 the same invention is shown in connection with a hand-operated lubricator. This lubricator has a piston 61 connected to a handle 62 by a rod 61' for periodically forcing grease or oil to the chassis. Secured to the cylinder 63 of the lubricator is a cylinder 64 having piston 65 therein and being connected to pipe 9'. One end of a lazy-tongs 66 is connected to piston 65, the opposite end being connected to handle 62 by a pin 62', and an intermediate pivot 66' secures the lazy-tongs to the lubricant cylinder 63. When the control mechanism connects pipe 9' to a suction line, the piston 65 is moved to the opposite end of the cylinder 64 and operates lazy-tongs 66 which draws outward the plunger of the oil pump 63 against its own spring pressure, thereby filling the cylinder 63 with lubricating oil below the plunger. When the release valve releases the vacuum, the plunger is slowly forced inward by its own spring pressure, thus forcing oil through the oil leads.

In Fig. 9, an electric system of control as associated with the odometer dials is shown. The dials 4, 5 and 6 are formed of insulation and each has a sleeve of metal designated respectively 4', 5' and 6'. On the insulating hub 70 which supports the dials are two sleeves 71 and 72, the sleeve 71 being in rubbing engagement with sleeve 6' of dial 6, and sleeve 72 being in rubbing engagement with sleeves 5' and 4' of dials 5 and 4.

Each dial has an electric contact finger connected to its sleeve and extending outwardly and projecting beyond the rim of the dial. These contacts are designated 74, 75 and 76 for the dials 4, 5 and 6, respectively. Mounted on an insulating panel are contacts 77, 78 and 79 for engagement by contacts 74, 75 and 76 respectively, contacts 78 and 79 being electrically connected. The electric circuit includes one wire connected to sleeve 71 and the other wire to contact 77 and includes a source of electric energy and an electric motor for an oil pump, a magnetic clutch to engage the automobile drive shaft, or any electrically operated lubricating means. It will be understood that every one hundred miles of travel, the electric circuit will be completed to thereby operate the lubrication means for the chassis, since the circuit will then be closed by engagement of contacts 74 and 77, —75 and 78, —76 and 79. After one-tenth mile travel the electric circuit will be broken by movement of dial 4.

The invention has been described as associated with a motor vehicle but it is not so limited since it may be applied to any mechanism requiring lubrication wherein the relative movement of the parts to be lubricated is not continuous or regular. By this invention such parts may be automatically lubricated in response to the actual movement thereof. This may be accomplished according to this invention by the use of a revolution counter or any sort of movement recorder in association with the above-described invention.

So far as I am aware, it is broadly new to provide a normally inoperative lubricating system, an energizing circuit for rendering the lubricant system operative only when the circuit is completed to permit flow therethrough, and a plurality of control members serially arranged in the energizing circuit, the control members being moved into and out of circuit interrupting position in time cycles of different length. The advantage of such a system is that one control member determines the time interval between successive lubrication periods, and another control member determines the length of the lubrication period which is actually established. As shown in Fig. 9, the supply circuit may be electrical or, as shown by the other figures, it may be a fluid pressure circuit.

Various modifications of the invention may be made within the scope of the invention as expressed in the following claims.

What I claim is:

1. In a lubricating device for automotive vehicles, in combination with a vehicle, means for lubricating the chassis thereof, an odometer having indicating dials thereon, a plurality of serially arranged valves for periodically rendering said lubricating means operable, and means on said odometer dials for actuating said valves.

2. In a lubricating device for automotive vehicles, in combination with a vehicle, means for lubricating the chassis thereof, a conduit connected to said lubricating means for the passage of fluid to thereby render said lubricating means operable, a plurality of valves serially arranged in said conduit, an odometer on said vehicle, and means operated in response to movement of said odometer for actuating said valves.

3. The structure as in claim 2 wherein a release valve is provided for by-passing the passage of fluid in said conduit, and means on said odometer to operate said release valve.

4. The structure as in claim 2 wherein the means operated in response to movement of said odometer for actuating said valves is arranged to open said valves simultaneously at the end of a predetermined linear movement of said vehicle, and a release valve is opened by said odometer subsequent to the simultaneous opening of said valves.

5. In an automatic lubricating mechanism for vehicles, in combination with lubricant forcing means an odometer having dials for registering travel of a vehicle, a fluid conduit, a plurality of serially arranged valves in said conduit, means connected to said valves for operating said forcing means, lugs on said dials for simultaneously opening said valves at a predetermined setting of said dials, a bleed passage connected into said conduit, a release valve in said passage, and a lug on one of said odometer dials for opening said release valve at a predetermined movement of said last named dial past the said predetermined settings.

6. The structure as in claim 5 wherein the odometer dials having the lugs thereon for opening said serially arranged valves are the dials which register the tenths, units and tens of miles travelled, and the lug which opens said release valve is on said tenths dial of the odometer.

7. In a lubricating system for vehicles, the combination with a vehicle having a drive shaft, of lubricant forcing means for lubricating relatively movable members of said vehicle, and clutch means operative periodically in response to a predetermined linear travel of said vehicle for connecting said lubricant forcing means to said drive shaft.

8. A lubricating system for vehicles, the combination with a vehicle having a drive shaft, of a lubricant forcing means for lubricating relatively movable members of said vehicle, means operative periodically in response to linear travel of said vehicle for connecting said lubricant forcing means to said drive shaft, and means for rendering inoperative said connecting means in response to a predetermined linear travel of said vehicle after the operation of said connecting means.

9. The structure as in claim 8 wherein the means for connecting the lubricant forcing means to the drive shaft includes a normally disengaged clutch mechanism, and fluid pressure operated means to engage said clutch mechanism.

10. In apparatus for automatically lubricating relatively movable members, the combination with fluid pressure actuated means for supplying lubricant to said members, of means actuated by a predetermined degree of relative movement of said members for controlling said supplying means, said controlling means comprising a conduit communicating with said lubricant supplying means to apply fluid pressure thereto, a plurality of serially acting controls for said conduit, and a movement responsive device having a plurality of serially operated elements arranged to cooperate with said controls.

11. The invention as set forth in claim 10, wherein said controls comprise valves having operating members and said elements comprise rotatable members having lugs for actuating said operating members.

12. In apparatus for automatically lubricating relatively movable members, the combination with fluid pressure actuated means for supplying lubricant to said members, of means actuated by a predetermined degree of relative movement of said members for controlling said supplying means; said controlling means comprising a conduit communicating with said lubricant supplying means to apply thereto the pressure of an operating fluid, a plurality of control members active when in a predetermined relative position to establish a flow of operating fluid in said conduit for rendering said supplying means operative, and a movement responsive device having a plurality of serially operated elements for moving said control members.

13. In lubricating apparatus for relatively movable members, the combination with means for supplying lubricant to said members and a control device for said supplying means comprising a fluid conduit, means for creating a vacuum in said conduit, a plurality of serially arranged valves in said conduit, and a plurality of means actuated by the relative movement of said members for operating the respective valves.

14. In a lubricating system for relatively movable members, the combination with an oil line and means for pumping oil through said line, of apparatus for controlling said pumping means comprising a fluid conduit, means for creating a vacuum in said conduit, a plurality of serially arranged valves in said conduit, a bleeder valve in said conduit, opening means for each of said valves, means actuated upon different predetermined degrees of movement of said members for periodically operating the respective opening means of the serially arranged valves, and means for operating the opening means of said bleeder valve upon a predetermined degree of movement of said members following the simultaneous operation of the opening means of all of said serially arranged valves.

15. In a lubricating system for an automotive transportation device, the combination with a power plant and control system including a plurality of moving elements, of means for supplying lubricant to relatively movable parts of said device, a normally inoperative driving connection between one of said moving elements and said lubricant supply means, and means additional to said driving connection and controlled by the travel of said device for periodically rendering said driving connection operative.

16. The invention as set forth in claim 15, in combination with means controlled by the travel of the device for rendering said driving connection inoperative when the said device has traveled a predetermined distance beyond the point at which said driving connection was rendered operative.

17. In a device for lubricating relatively movable parts, the combination with lubricant supply means, of control means for periodically rendering said supply means operative to deliver lubricant to relatively movable parts; said control means comprising a counting mechanism having a plurality of rotatable elements and means for intermittently advancing certain of said rotatable elements through cycles corresponding to different and predetermined numbers of complete rotations of a first rotatable elements, means for rotating said first rotatable element in accordance with the relative movement of the said movable parts, a plurality of control members effective only when all are simultaneously actuated to render said supply means operative, and means on the certain rotatable elements of said counting mechanism for periodically actuating the several control members when the respective rotatable elements stand at rest between successive intermittent advances thereof.

WALTER MAYNARD LIPPINCOTT.